(12) United States Patent
Knappe

(10) Patent No.: US 7,180,997 B2
(45) Date of Patent: Feb. 20, 2007

(54) METHOD AND SYSTEM FOR IMPROVING THE INTELLIGIBILITY OF A MODERATOR DURING A MULTIPARTY COMMUNICATION SESSION

(75) Inventor: Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 10/236,484

(22) Filed: Sep. 6, 2002

(65) Prior Publication Data

US 2004/0052218 A1    Mar. 18, 2004

(51) Int. Cl.
*H04M 3/56* (2006.01)
(52) U.S. Cl. .............................. 379/387.01; 379/202.01
(58) Field of Classification Search ............... 379/202, 379/202.07, 203.07, 204.07, 205.07, 206.07
See application file for complete search history.

(56) References Cited

U.S. PATENT DOCUMENTS

| | | | |
|---|---|---|---|
| 4,499,578 A | 2/1985 | Marouf et al. | ................. 370/62 |
| 6,011,851 A | 1/2000 | Connor et al. | ................. 381/17 |
| 6,178,237 B1 | 1/2001 | Horn | ........................... 379/202 |
| 6,272,214 B1 * | 8/2001 | Jonsson | .................. 379/202.01 |
| 2002/0181686 A1 * | 12/2002 | Howard et al. | ......... 379/202.01 |

FOREIGN PATENT DOCUMENTS

| | | |
|---|---|---|
| EP | 0 730 365 A2 | 9/1996 |
| WO | WO 00/72560 A1 | 11/2000 |

OTHER PUBLICATIONS

PCT Notification of International Search Report, Application No. PCT/US03/25580 filed Aug. 15, 2003, Authorized by Carole Emery and mailed Jan. 1, 2004.
Kok Soon Phua et al., "*Spatial Speech Coding for Multi-Teleconferencing*", TENCON 99, Proceedings of the IEEE Region 10 Conference, Cheju Island, South Korea, Sep. 15-17, 1999, pp. 313-316.

* cited by examiner

*Primary Examiner*—Sinh Tran
*Assistant Examiner*—Walter F Briney, III
(74) *Attorney, Agent, or Firm*—Baker Botts L.L.P.

(57) ABSTRACT

A system and method for improving the intelligibility of a moderator during a multi-party communication session includes receiving a plurality of participant voice streams from a plurality of respective conference participants. An incoming moderator voice stream may be received from a moderator. The plurality of participant voice streams and the moderator voice stream are transmitted such that the intelligibility of the moderator voice stream is improved relative to at least one of the participant voice streams.

40 Claims, 4 Drawing Sheets

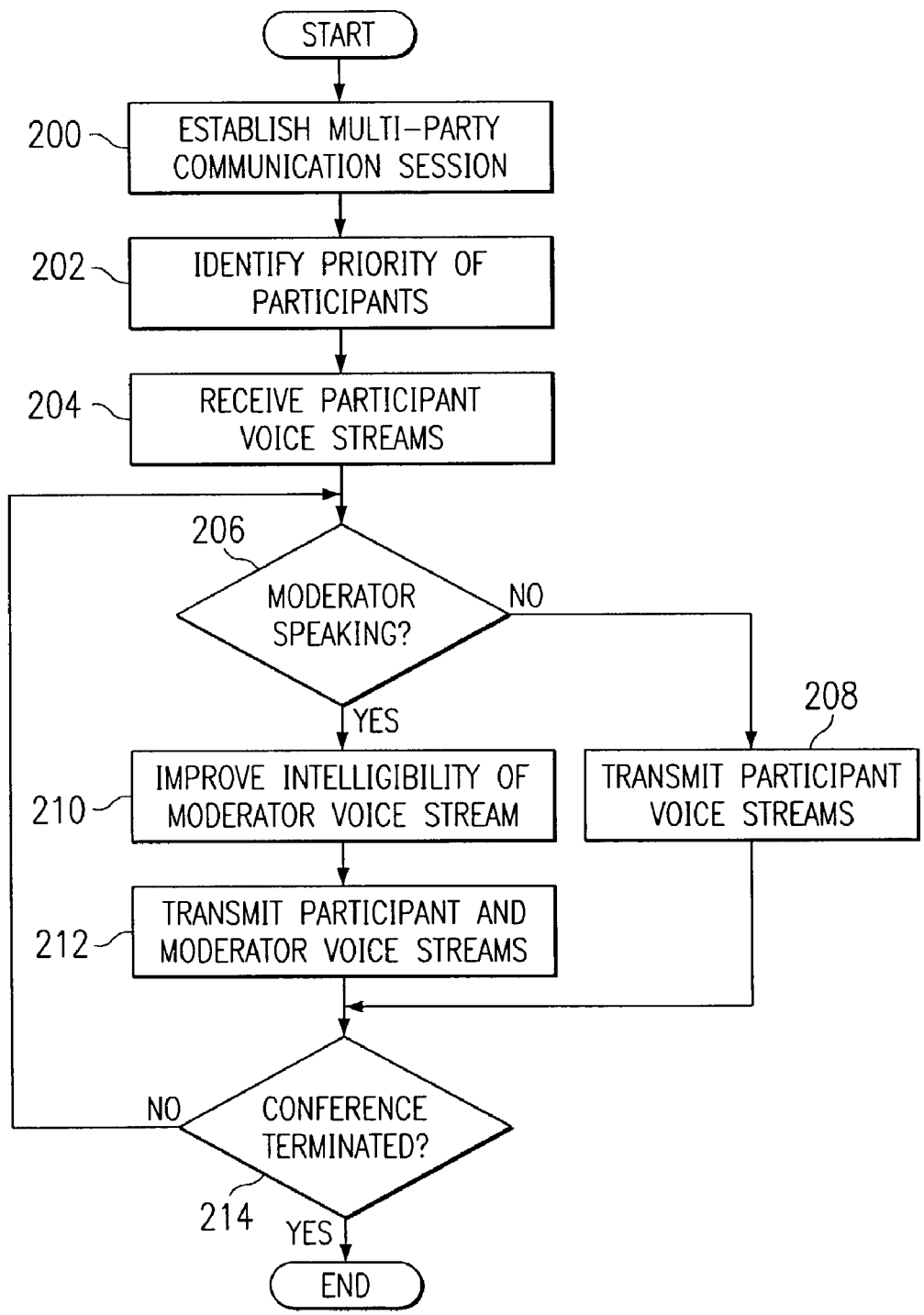

METHOD AND SYSTEM FOR IMPROVING THE INTELLIGIBILITY OF A MODERATOR DURING A MULTIPARTY COMMUNICATION SESSION

TECHNICAL FIELD OF THE INVENTION

The present invention relates generally to the field of multiparty communications, and more particularly to a method and system for improving the intelligibility of a moderator during a multiparty communication session.

BACKGROUND OF THE INVENTION

Communication networks, such as the Public Switched Telephone Network (PSTN), for transporting electrical representations of audible sounds from one location to another, are well known. Additionally, packet switched networks, such as the Internet, are able to perform a similar function by transporting packets containing data that represents audible sounds from one location to another. The audible sounds are encoded into digital data and placed into packets at the origination point, and extracted from the packets and decoded into audible sounds at the destination point.

Such communication networks also allow multiple people to participate in a single call, typically known as a "conference call." In a conference call, the audible sounds at each device, usually telephones, are distributed to all of the other devices participating in the conference call. Thus, each participant in the conference call may share information with all of the other participants.

Modern business practices often require that several persons meet on the telephone to engage in a conference call. The conference call has introduced certain applications and techniques that are superior to those found in a meeting with persons physically present in the same location. For example, a conference call attendee who is not participating at the moment may wish to mute their audio output and simply listen to the other conferences. This allows the particular conferencee to work on another project while still participating in the conference.

While the conference call has been substantially helpful in minimizing travel expenses and other costs associated with business over long distances, significant obstacles still remain in accomplishing many tasks with the same efficiency as one would in having a meeting with all persons in the same physical location. For example, the inability of conferencees to use or see visual aids or commands complicates the control and organization of the conference. This often results in multiple speakers "stepping-on" each other's speech such that the resultant audio is incomprehensible. Furthermore, it is difficult to determine which participant(s) is speaking at any given time. Accordingly, it is difficult for a designated moderator(s) to control the flow and/or organization of the conference.

SUMMARY OF THE INVENTION

The present invention provides an improved method and system for enhancing the intelligibility of a moderator during a multiparty communication session that substantially eliminate or reduce the disadvantages and problems associated with previous systems and methods. In particular, the intelligibility of audio generated by a conference moderator is improved with respect to other conference participants. This enhances the ability of the moderator to control the organization, flow and/or control of the conference.

In accordance with a particular embodiment of the present invention, a system and method for improving the intelligibility of a moderator during a multi-party communications session includes receiving a plurality of participant voice streams from a plurality of respective conference participants. An incoming moderator voice stream is also received, from a moderator. The method includes processing the plurality of participant voice streams and the moderator voice stream such that the intelligibility of the moderator voice stream is enhanced relative to at least one of the participant voice streams.

In accordance with another embodiment of the present invention, the method includes storing a priority associated with each of the plurality of participant voice streams, such that at least one lowest priority voice stream may be identified. In this embodiment, the incoming moderator voice stream is detected and transmitted to the conference participants. The at least one lowest priority voice stream may be blocked from transmission, while the moderator voice stream is being transmitted.

In accordance with yet another embodiment, an increase in signal strength of the incoming moderator voice stream is detected. The participant voice streams are transmitted with a diminished signal strength approximately proportional to the increase in the signal strength of the incoming moderator voice stream.

Technical advantages of particular embodiments of the present invention include an improved method and system for improving the intelligibility of a moderator, during a multiparty communication session. The present invention allows the moderator's voice stream to be enhanced with respect to other conference participants. Accordingly, conference participants can distinguish the moderator from other conference participants.

Another technical advantage of particular embodiments of the present invention includes a method for improving the intelligibility of a moderator, in which the lowest priority voice stream may be blocked while the moderator's voice stream is being transmitted. This allows the moderator to speak over one participant, while allowing the rest of the participants to continue speaking intelligibly, while the moderator is exercising control over the telephone conference.

Other technical advantages of the present invention will be readily apparent to one skilled in the art from the following figures, description and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 8 is a flow diagram illustrating a method for improving the intelligibility of a moderator, during a conference call, in accordance with one embodiment of the present invention.

DETAILED DESCRIPTION OF THE INVENTION

Figure 1:
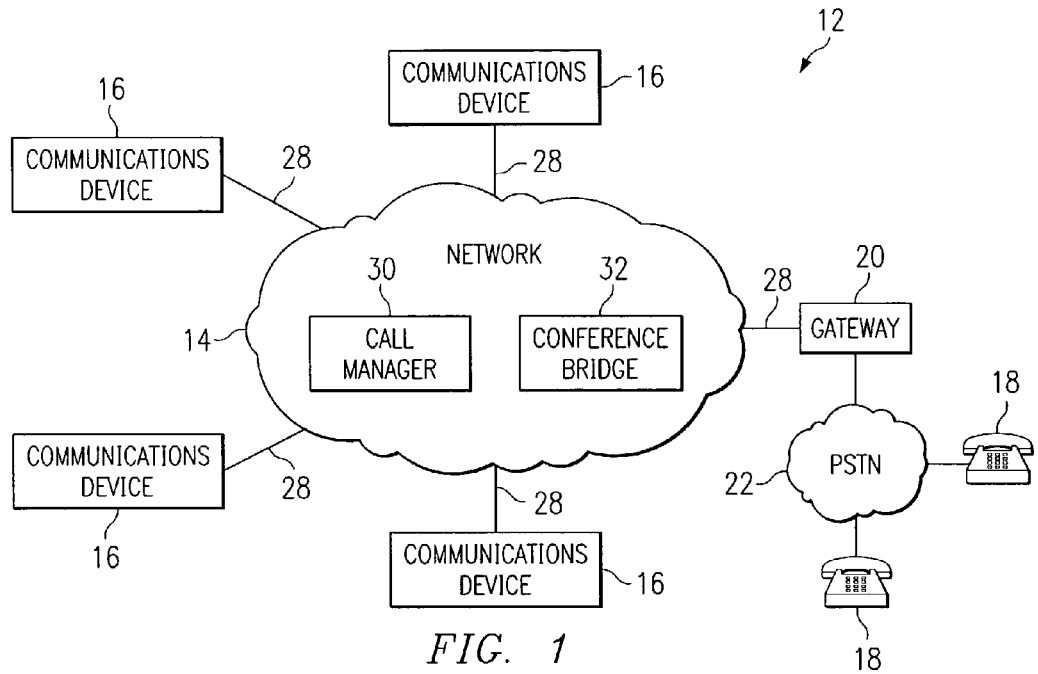
FIG. 1 is a block diagram illustrating a communications system, in accordance with one embodiment of the present invention.

FIG. 1 illustrates a communication system 12 in accordance with one embodiment of the present invention. In this embodiment, the communication system 12 is a distributed system transmitting audio, video, voice, data and other suitable types of real-time and/or non real-time traffic between source and destination endpoints. Communication system 12 may be used to conduct multiple party telephone conference communication sessions. In accordance with a particular embodiment of the present invention, various components of communication system 12 may be configured to automatically improve the intelligibility of a moderator during a multi-party communication session. The disclosed embodiments allow the moderator to exercise control and influence over the telephone conference, without completely silencing all other participants. The various methods and systems by which this is accomplished are described and illustrated herein.

Referring to FIG. 1, communication system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable type of wireline or wireless links 28.

In accordance with a particular embodiment, network 14 is the Internet, a wide area network (WAN), a local area network (LAN) or other suitable packet-switched network. In the Internet embodiment, the network 14 transmits information in Internet Protocol (IP) packets. Telephony voice information is transmitted in the Voice over IP (VoIP) format. Real-time IP packets such as VoIP packets are encapsulated in real-time transport protocol (RTP) packets for transmission over the network 14. It will be understood that the network 14 may comprise any other suitable types of elements and links and that traffic may be otherwise suitably transmitted using other protocols and formats.

The communication devices 16 comprise IP or other digital telephones, personal and other suitable computers or computing devices, personal digital assistants (PDAs), cell or other mobile telephones or handset or any other device or set of devices such as the telephone 18 and gateway 20 combination capable of communicating real-time audio, video and/or other information over the network 14. The communication devices 16 also communicate control information with the network 14 to control call setup, teardown and processing as well as call services.

For voice calls, the communication devices 16 comprise real-time applications that play traffic as it is received or substantially as it is received and to which packet delivery cannot be interrupted without severely degrading performance. A codec (coder/decoder) converts audio, video or other suitable signals generated by users from analog signals into digital form. The digital encoded data is encapsulated into IP or other suitable packets for transmission over the network 14. IP packets received from the network 14 are converted back into analog signals and played to the user. It will be understood that the communication devices 16 may otherwise suitably encode and decode signals transmitted over or received from the network 14.

The gateway 20 provides conversion between analog and/or digital formats. The standard analog telephones 18 communicate standard telephony signals through PSTN 22 to the gateway 20. At the gateway 20, the signals are converted to IP packets in the VoIP format. Similarly, VoIP packets received from the network 14 are converted into standard telephony signals for delivery to the destination telephone 18 through PSTN 22. The gateway 20 also translates between the network call control system and the Signaling System 7 (SS7) protocol and/or other signaling protocols used in PSTN 22.

In one embodiment, the network 14 includes a call manager 30 and a conference bridge 32. The call manager 30 and the conference bridge 32 may be located in a central facility or have their functionality distributed across and/or at the periphery of the network 14. The call manager 30 and the conference bridge 32 are connected to the network 14 by any suitable type of wireline or wireless link. In another embodiment, the network 14 may be operated without the call manager 30, in which case the communication devices 16 may communicate control information directly with each other or with other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics, non real-time connections and/or a combination of connection types.

The call manager 30 is responsive to service requests from the communication devices 16, including the standard telephones 18 through the gateway 20. For example, the call manager 30 may provide voicemail, bridging, multicasting, call hold, conference call and other multiparty communications and/or other suitable services for the communications devices 16. The call manager 30 provides services by performing the services, controlling performance of the services, delegating performance of the services and/or by otherwise initiating the services.

The conference bridge 32 provides conference call and other suitable audio, video, and/or real-time multiparty communication sessions between communication devices 16. A multiparty communication session includes three or more parties exchanging audio and/or other suitable information. In particular, the conference bridge 32 receives media from participating devices 16 and, using suitable signal processing techniques, mixes the media to produce conference signals. During normal operation, each device 16 receives a conference signal that includes contributions from all other participating devices. As used herein, the term each means every one of at least a subset of the identified items.

As described in more detail below, the conference bridge 32 improves the intelligibility of a moderator during multi-party communication sessions. In particular, the conference bridge 32 provides a system and method for enhancing the voice stream of the conference moderator, with respect to voice streams of other participants.

In operation, a call initiation request is first sent to the call manager 30 when a call is placed over the network 14. The call initiation request may be generated by a communication device 16 and/or the gateway 20 for telephones 18. Once the call manager 30 receives the call initiation request, the call manager 30 sends a signal to the initiating communication device 16 and/or gateway 20 for telephones 18 offering to call the destination device. If the destination device can accept the call, the destination device replies to the call manager 30 that it will accept the call. By receiving this acceptance, the call manager 30 transmits a signal to the destination device causing it to ring. When the call is answered, the call manager 30 instructs the called device and the originating device to begin media streaming to each other. If the originating device is a PSTN telephone 18, the media streaming occurs between the gateway 20 and the destination device. The gateway 20 then transmits the media to the telephone 18.

For conference calls, the call manager 30 identifies participants based on the called number or other suitable criteria. The call manager 30 controls the conference bridge 32 to set up, process and tear down conference calls and other multiparty communication sessions. During the multiparty communications sessions, participants are connected and stream media through the conference bridge 32. The media is cross connected and mixed to produce conference output streams for each participant. The conference output stream for a participant includes the media of all other participants, a subset of other participants or other suitable mix dictated by the type of multiparty session and/or the participant.

Figure 2:
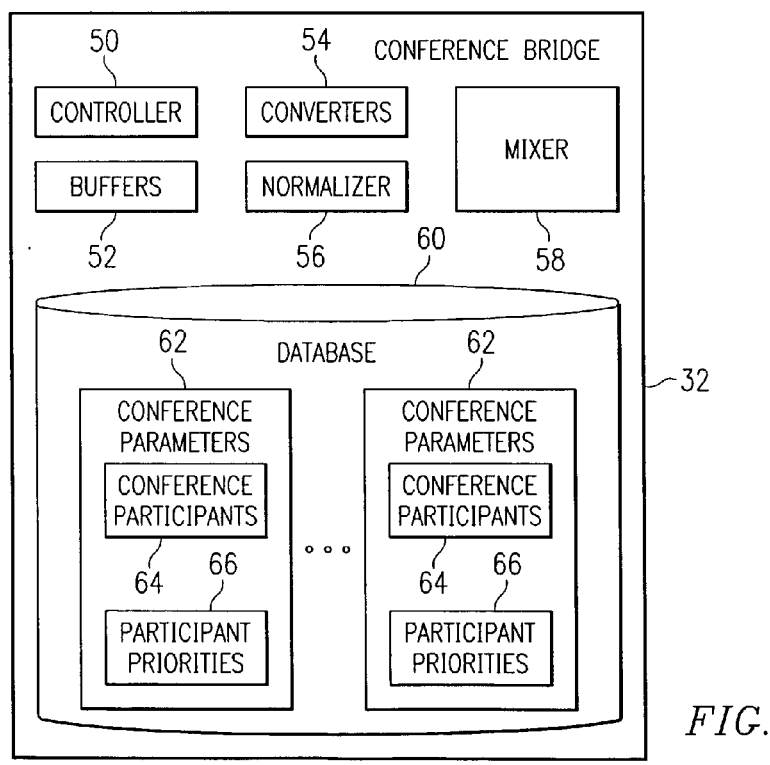
FIG. 2 is a block diagram illustrating details of the conference bridge of FIG. 1, in accordance with one embodiment of the present invention.

FIG. 2 illustrates details of the conference bridge 32 in accordance with a particular embodiment of the present invention. In this embodiment, the conference bridge 32 provides real-time multiparty audio connections between three or more participants. It will be understood that the conference bridge 32 may support other types of suitable multiparty communications sessions including real-time audio streams and/or video streams, without departing from the scope of the present invention.

Referring to FIG. 2, conference bridge 32 includes a controller 50, buffers 52, converters 54, normalizer 56, mixer 58 and database 60. The controller 50, buffers 52, converters 54, normalizer 56, mixer (e.g., adaptive summers) 58 and database 60 of the conference bridge as well as other suitable components of the communications system 12 may comprise logic encoded in media. Logic comprises functional instructions for carrying out programmed tasks. The media comprises computer disks or other suitable computer-readable media, applications specific integrated circuits (ASIC), field programmable gate arrays (FPGA) or other suitable specific or general purpose processors, transmission media or other suitable media in which logic may be encoded and utilized.

The controller 50 directs the other components of the conference bridge 32 and communicates with the call manager 30 to set up, process and tear down conference calls. The controller 50 also receives information regarding the priority of each participant either directly from the communication devices 16 or through the call manager 30. Such information is stored in the database 60.

The buffers 52 include input and output buffers. The input buffers receive and buffer packets of input audio streams from participants for processing by the conference bridge 32. The output buffers receive and buffer conference output streams generated by the conference bridge 32 for transmissions to participants. In a particular embodiment, a particular input buffer or set of input buffer resources are assigned to each audio input stream and a particular output buffer or set of output buffer resources are assigned to each conference output stream. The input and output buffers may be associated with corresponding input and output parts or interfaces and perform error check, packet loss prevention, packet ordering and congestion control functions.

The converters 54 include input and output converters. The input converters receive input packets of a participant from a corresponding buffer and convert the packet from the native format of the participant's device 16 to a standard format of the conference bridge 32 for cross linking and processing in the conference bridge 32. Conversely, the output converters receive conference output streams for participants in the standard format and convert the conference output streams to the native format of participant's devices. In this way, the conference bridge 32 allows participants to connect using a variety of devices and technologies.

The normalizers 56 include input and/or output normalizers. The normalizers receive packets from the input audio streams in a common format and normalize the timing of the packets for cross connections in the mixer 58.

The mixer 58 includes a plurality of summers or other suitable signal processing resources each operable to sum, add or otherwise combine a plurality of input streams into conference output streams for participants to a conference call. As described in more detail below, the mixer 58 may be a monaural mixer or a stereo mixer. Once the mixer 58 has generated the conference output streams, each conference output stream is converted by a corresponding converter and buffered by a corresponding output buffer for transmission to the corresponding participant.

The database 60 includes a set of conference parameters 62 for each ongoing conference call of the conference bridge 32. The conference parameters 62 for each conference call include an identification of participants 64 and the priority assigned to each participant (priority parameters) 66 for the conference call. In one embodiment, the participants are identified at the beginning of a conference call based on caller ID, phone number or other suitable identifier. The priority parameters may be initially set to a default.

Figure 3:
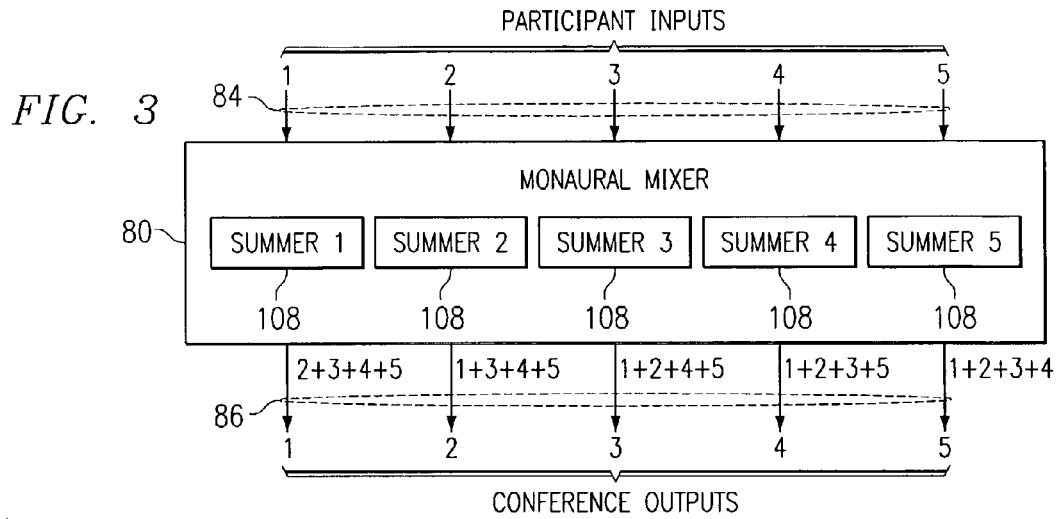
FIG. 3 is a block diagram illustrating a monaural mixer for the conference bridge of FIG. 2, in accordance with one embodiment of the present invention.

FIG. 3 illustrates components and operation of the mixer 58 in a monaural embodiment of the present invention. In particular, FIG. 3 illustrates details of a monaural mixer 80 in accordance with a particular embodiment. It will be understood that a monaural mixer may be otherwise suitably implemented without departing from the scope of the present invention.

Referring to FIG. 3, the monaural mixer 80 receives participant input streams 84 and combines the streams in summers 82 to generate conference output streams 86 for each participant to a conference call. In one embodiment, each participant is assigned a summer 82 that receives audio input streams from each other participant to the conference call. The summer 82 combines the audio input streams to generate a conference output stream for delivery to the participant.

During normal operation, each participant receives the audio input of each other participant. Thus, for example, the conference output stream of participant 1 includes the audio inputs of participants 2–5. Similarly, the conference output stream of participant 2 includes the audio inputs of participants 1 and 3–5. The conference output stream of participant 3 includes the audio inputs of participants 1–2 and 4–5. The conference output stream of participant 4 includes the audio inputs of participants 1–3 and 5. The conference output stream of participant 5 includes the audio inputs of participants 1–4.

The audio input 84 of the conference moderator may be amplified and/or the audio input 84 of the remaining participants attenuated to focus on or provide higher prominence to the audio input 84 of the conference moderator. A higher prominence is provided by increasing the intelligibility of the moderator relative to the remaining participants.

For a conference moderator, the audio streams may be made prominent in the conference output stream by amplifying the voice input stream of the moderator or by attenuating voice input streams 90 of the other participants. For example, the voice input stream of the moderator may be multiplied by "1.2" while the voice input streams of the other conference participants are multiplied by "0.8". Other methods for enhancing the intelligibility of the moderator with respect to other conference participants will be described with regard to FIGS. 4–8.

Figure 4:
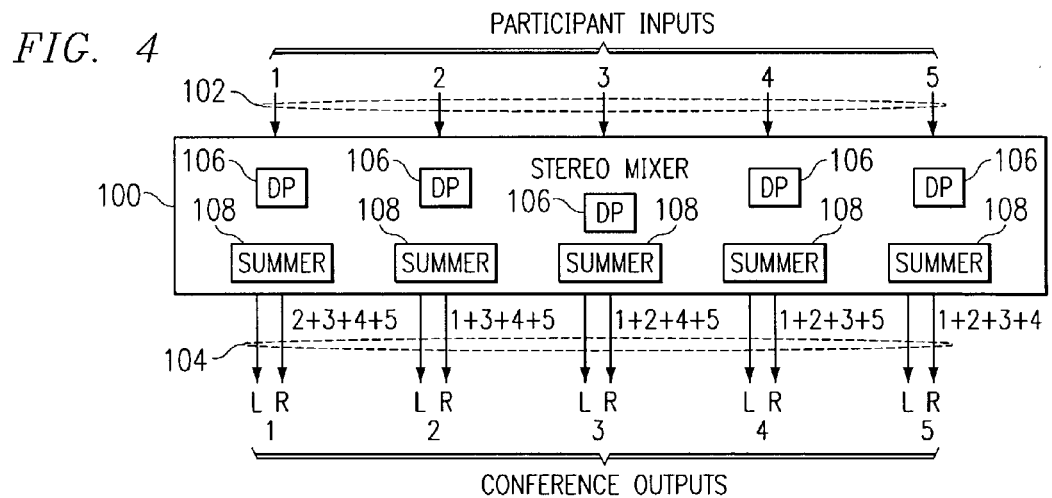
FIG. 4 is a block diagram illustrating a stereo mixer for the conference bridge of FIG. 2, in accordance with one embodiment of the present invention.
Figure 5:
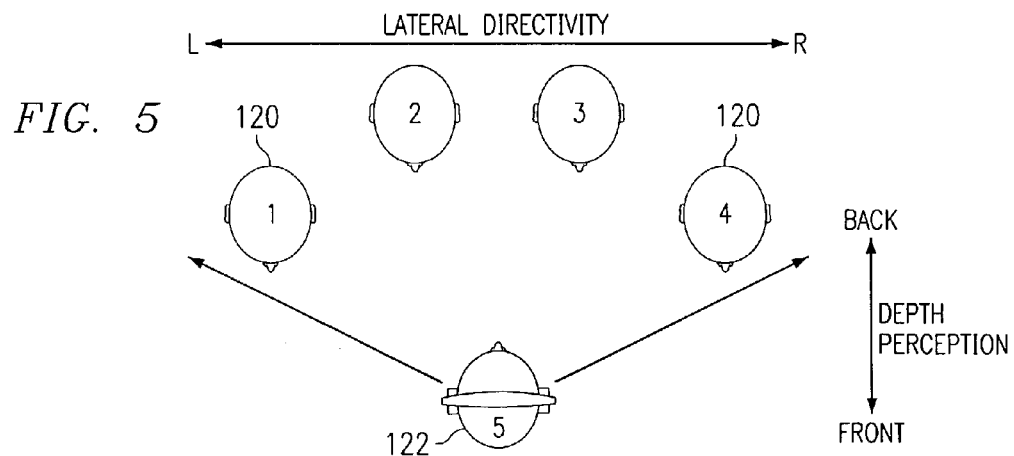
FIG. 5 is a block diagram illustrating spatial placements of participants in a stereo conference stream generated by the stereo mixer of FIG. 6, in accordance with one embodiment of the present invention.
Figure 6:
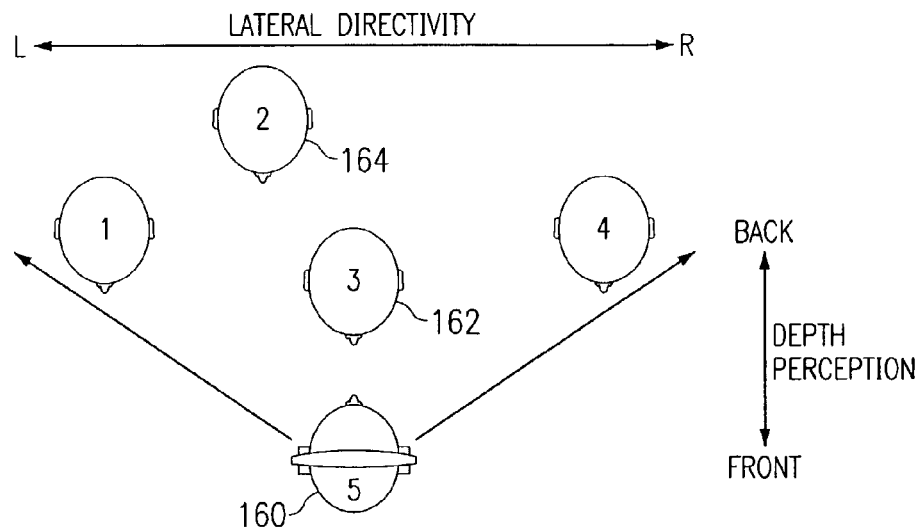
FIG. 6 is a block diagram illustrating spatial movement of a conference moderator to a position of higher prominence in a stereo conference stream, in accordance with one embodiment of the present invention.
Figure 7:
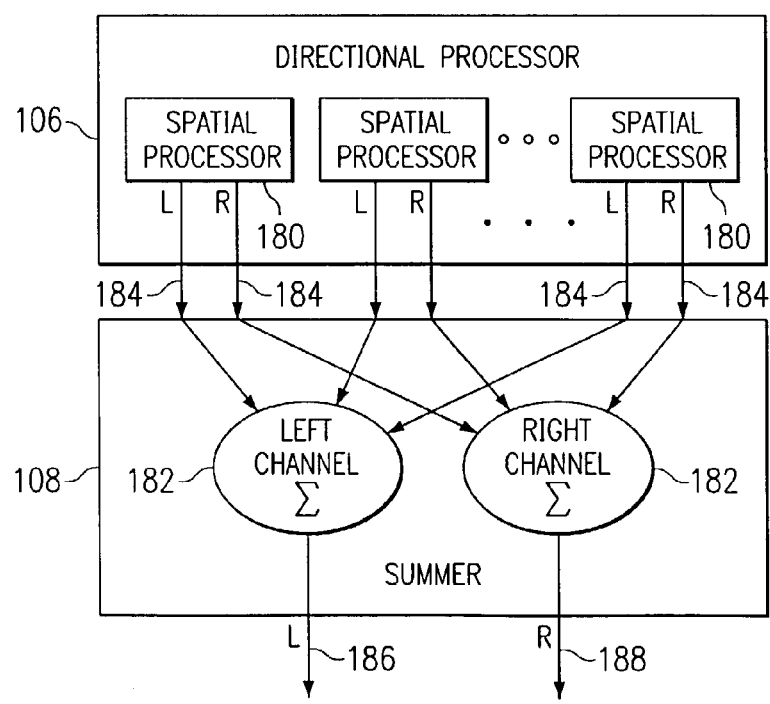
FIG. 7 is a block diagram illustrating the directional processors and summers of the stereo mixer of FIG. 6, in accordance with one embodiment of the present invention.

FIGS. 4–7 illustrate components and operation of the mixer 58 in a stereo embodiment of the present invention. In particular, FIG. 6 illustrates details of a stereo mixer 100 in accordance with a particular embodiment. FIG. 5 illustrates spatial positioning of participant audio in a stereo conference stream of a conference call participant. FIG. 7 illustrates details of a directional processor 106 and a summer 108 of the stereo mixer 100.

Referring to FIG. 4, the stereo mixer 100 receives participant input streams 102 and generates stereo conference output streams 104 using the directional processors 106 and the summers 108. In one embodiment, each participant is assigned a directional processor 106 and a summer 108. The directional processor 106 receives audio input streams 102 from other participants to the conference call and generates spatially positioned stereo streams that are combined by the summer 108 to generate the stereo conference output streams 104. Each stereo conference output stream 104 includes a left (L) and a right (R) channel.

During normal operation, each participant receives the audio input of each other participant to a conference call. Thus, for example, the stereo conference output stream for participant 1 includes the audio inputs of participants 2–5. Similarly, the stereo conference output stream for participant 2 includes the audio inputs from participants 1 and 3–5. The stereo conference output stream for participant 3 includes the audio inputs of participants 1–2 and 4–5. The stereo conference output stream for participant 4 includes the audio inputs from participants 1–3 and 5. The stereo conference output stream for participant 5 includes the audio inputs from participants 1–4.

Referring to FIG. 5, each stereo conference output stream 104 includes audio inputs or sources 120 from the other participants or groups of participants that are perceived by the listener 122 as coming from different spatial locations. The spatial locations vary from front to back in the listener's depth perception and from left to right in the listener's lateral directivity. Because the sound sources are spatially separated, the listener 122 can more easily focus on individual sound sources of auditory information in the presence of other sound sources. Thus, the spatial separation of the sound sources 120 increases the ability of the listener 122 to differentiate between the multiple sound sources 120.

In the illustrated embodiment, each participant 1–4 is spatially positioned in front and at an equal distance from the participant 5. In this configuration, each participant 1–4 has an equal degree or substantial degree of prominence with respect to the participant 5. As described in more detail below, participants 1–4 in the stereo conference output stream 104 may be repositioned to the foreground to provide a higher degree of intelligibility and prominence to participant 5.

Referring to FIG. 6, the output stream 104 for participant 5, for example, includes the audio input of moderator 3 in the foreground with the other participants 1, 2 and 4 in the background. The foreground position provides participant 5 or other listener 160 with the highest degree of intelligibility such that the listener may focus on moderator 3 or other moderator audio sources 162 while still hearing non-moderator sources 164 in the background. It will be understood that moderator 162 may be otherwise suitably positioned in the output stream(s) 104, without departing from the scope of the present invention.

Referring to FIG. 7, the directional processor 106 of the stereo mixer 100 includes a plurality of spatial processors 180 and the summer 108 includes a left and right channel summers 182. The spatial processors 180 each present monaural sources at different locations in a binaural sound field using standard intensity panning and/or Head Related Transfer Function (HRTF) position filtering. The binaural sound streams each include left and right channels components 184 generating a perceived position such as, for example, back/left front/center and back/right. The left channel of each binaural stream is fed to the left channel summer 182 while the right channels are fed to the right channel summer 182. The summers 182 generate a combined left stream 186 and combined right stream 188 including a perceived plurality of discrete audio inputs spatially positioned in two or three dimensional space relative to the listener. Further information regarding the directional processor 106 and summer 108 are provided in co-owned U.S. Pat. No. 6,011,851, which is hereby incorporated by reference. It will be understood that stereo mixer 100 and sidebar mixers 140 may be otherwise suitably implemented without departing from the scope of the present invention.

FIG. 8 illustrates a method for improving the intelligibility of a moderator during a multi-party communication session, in accordance with a particular embodiment of the present invention. The method begins at step 200 where a multi-party communication session is established. At step 202, a priority of one or more participants is identified. For example, at least one participant may be given the priority of moderator for a particular conference call. Typically, the moderator will receive the highest priority in a conference call. Therefore, in accordance with one embodiment, the priorities simply include moderator for one or more parties, and participant for the remaining parties. However, other participants may be prioritized even further. For example, participants may be prioritized according to groups in which one or more participants will have "high priority", and other participants will have "low priority". In still another embodiment, each participant may be prioritized with respect to the others, such that each participant in the conference call has a different priority from all other participants.

The priority of a particular participant may be assigned, in advance, by a coordinator of the specific conference call. In other embodiments, the conference bridge may store priorities associated with various individuals, that are used as defaults for any particular conference call. The priority may be established automatically using phone numbers, employee numbers, IP addresses, names, titles, etc. Such default priorities may be updated periodically to reflect promotions, or other changes that may impact the hierarchy within an organization.

At step 204, the particular telephone conference has begun and participant voice streams are received. At step 206, the system monitors the voice streams being received to determine whether or not the moderator is speaking, or attempting to speak. If the moderator is not speaking, at step 208 the participant voice streams are transmitted to all participants. It should be noted that the manner in which participant voice streams are transmitted in accordance with the present invention, may depend upon the priority of each participant. For example, in one embodiment, only a particular number of speakers will be allowed to transmit simultaneously (e.g., only four participants will be allowed to speak at once). In this configuration, the system may use the priority associated with each participant to determine which speakers will be allowed to "cut in" to the conversation. If a participant having a high priority attempts to cut in while a participant having a low priority is speaking, the system may automatically stop transmission of the voice stream from the low priority participant, in order to accommodate and transmit the voice stream of the high priority participant, without rendering the conversation unintelligible.

If the moderator voice stream is detected, at step 208 the intelligibility of the moderator voice stream is improved, relative to the other participants. It should be recognized that the intelligibility of the moderator voice stream may be improved using one or more of several methods, within the teachings of the present invention. For example, in one embodiment, the intelligibility of the moderator voice stream is improved by identifying a participant who is currently speaking that has the lowest priority of the participants currently speaking, and removing that participant's voice stream from the transmission to all participants. In this manner, a conversation having three current speakers will not be rendered completely unintelligible by the introduction of the moderator voice stream, since at least one of the three speakers' voice streams will be removed, in order to accommodate the moderator's voice stream. If more than one current speaker each have the lowest priority of the current speakers, more than one participant voice streams may be removed from the transmission stream. This avoids the situation in which the introduction of the moderator voice stream renders the entire conversation unintelligible to all participants.

In another embodiment, the transmission of the moderator voice stream is provided with an enhanced signal strength relative to a signal strength of the incoming moderator voice stream. For example, the signal strength of the moderator voice stream received at the system may be enhanced by approximately three decibels in a 2–3 kHz range, before transmitting the moderator voice stream. This provides the moderator with a distinctive advantage in "talking over" other participants. It also distinguishes the moderator with respect to all other participants, since the moderator voice stream will generally be more identifiable than voice streams from other participants.

In still another embodiment, when the moderator is speaking, one or more of the participant voice streams may be transmitted with a diminished signal strength relative to the signal strength of the participant voice streams received by the system. In this manner, the signal strength of all participants are attenuated while the moderator is speaking, in order to distinguish the moderator from all other participants. Thus, "improving", or "enhancing" the intelligibility of the moderator does not necessarily mean that the moderator voice stream received by the system needs to be improved, or enhanced. By attenuating the participant voice streams (in addition to, or in lieu of increasing the signal strength received from the moderator), a listener perceives that the moderator voice stream has been improved, or enhanced.

In still another embodiment, "side chain gain control" may be used to distinguish the moderator from other participants. In this embodiment, the system detects an increase in the signal strength received from the moderator, and diminishes the transmission of participant voice streams in an amount proportional to the increase in the moderator's signal strength. Therefore, the louder the moderator speaks, the quieter all other participants will be perceived by all participants. This allows the moderator to reflect authority and control by changing the tone or loudness of her voice.

In still another embodiment, the moderator may be distinguished from other participants using perceived spatial location of the participant voice streams. In this embodiment, the moderator voice stream may be processed such that participants perceive the moderator as positioned closer to the listener, than other participants. This allows participants to more readily identify the moderator when the moderator is speaking. For example, this may be accomplished using Head Related Transfer Function (HRTF) positional filtering, as previously described herein.

At step 212, the moderator and participant voice streams are transmitted with the improved intelligibility of the moderator voice stream. Next, at step 214, the method determines whether or not the conference has been terminated. If the conference has not been terminated, the system continues to monitor the moderator to determine if the moderator is speaking, at step 206. If the moderator continues speaking, the system continues improving the intelligibility of the moderator voice stream at step 210, and transmitting the participant and moderator voice streams with the improved intelligibility of the moderator voice stream, at step 212. When the moderator stops speaking, participant voice streams are transmitted at step 208. Again, at step 214, the system determines whether or not the conference has been terminated. If the conference has been terminated, the method ends. If the conference is not terminated, the method returns to step 206, to identify whether or not the moderator is speaking.

Although the present invention has been described with several embodiments, various changes and modifications may be suggested to one skilled in the art. It is intended that the present invention encompass such changes and modifications as fall within the scope of the appended claims.

What is claimed is:

1. A method for improving the intelligibility of a moderator during a multi-party communication session, comprising:
   automatically identifying a moderator initiating the multi-party communication session;
   receiving a plurality of incoming participant voice streams from a plurality of respective conference participants;
   receiving an incoming moderator voice stream from the moderator; and automatically processing the incoming plurality of participant voice streams and the incoming moderator voice stream based on the identification of the moderator and without input from any participant or the moderator during the multi-party communication session such that the intelligibility of the incoming moderator voice stream is always improved relative to at least one of the incoming participant voice streams.

2. The method of claim 1, further comprising:

for each of the incoming participant voice streams, storing a respective priority before the initiation of the communication session, such that at least one lowest priority participant voice stream may be identified;

detecting the incoming moderator voice stream;

transmitting the incoming moderator voice stream to the conference participants; and automatically preventing the at least one lowest priority voice stream from being received by the conference participants while the moderator voice stream is being transmitted.

3. The method of claim 1, further comprising transmitting the incoming moderator voice stream with an enhanced signal strength relative to a signal strength of the incoming moderator voice stream.

4. The method of claim 3, wherein the enhanced signal strength comprises approximately three decibels in a 2–3 kHz range.

5. The method of claim 1, further comprising transmitting one or more of the plurality of incoming participant voice streams with a diminished signal strength relative to signal strengths of the one or more of the plurality of incoming participant voice streams.

6. The method of claim 1, further comprising:

transmitting the incoming moderator voice stream; and transmitting each of the plurality of incoming participant voice streams with a diminished signal strength, while the incoming moderator voice stream is being transmitted.

7. The method of claim 1, further comprising:

detecting an increase in a signal strength of the incoming moderator voice stream; and transmitting the participant voice streams with a diminished signal strength approximately proportional to the increase in the signal strength of the incoming moderator voice stream.

8. The method of claim 1, further comprising transmitting the plurality of participant voice streams and the moderator voice stream such that a listener perceives the moderator voice stream as coming from a different spatial location than the plurality of participant voice streams.

9. The method of claim 8, further comprising transmitting the moderator voice stream such that a listener perceives the moderator as positioned closer to the listener than the conference participants.

10. The method of claim 8, further comprising transmitting the moderator voice stream using Head Related Transfer Function (HRTF) positional filtering.

11. A system for improving the intelligibility of a moderator during a multi-party communication session, comprising:

a controller operable to automatically identify a moderator initiating the multi-party communication session;

an input buffer being operable to receive a plurality of incoming participant voice streams from a plurality of respective conference participants, and an incoming moderator voice stream from the moderator; and a mixer operable to automatically process the plurality of incoming participant voice streams and the incoming moderator voice stream based on the identification of the moderator and without input from any participant or the moderator during the multi-party communication session such that the intelligibility of the incoming moderator voice stream is always improved relative to at least one of the incoming participant voice streams.

12. The system of claim 11, further comprising:

a database being operable to store a respective priority before the initiation of the communication session for each of the incoming participant voice streams, such that at least one lowest priority participant voice stream may be identified;

the mixer being further operable to transmit the incoming moderator voice stream to the conference participants; and the mixer being further operable to automatically prevent the at least one lowest priority voice stream from being received by the conference participants while the moderator voice stream is being transmitted.

13. The system of claim 11, wherein the mixer is further operable to transmit the incoming moderator voice stream with an enhanced signal strength relative to a signal strength of the incoming moderator voice stream.

14. The system of claim 13, wherein the enhanced signal strength comprises approximately three decibels in a 2–3 kHz range.

15. The system of claim 11, wherein the mixer is further operable to transmit one or more of the plurality of incoming participant voice streams with a diminished signal strength relative to signal strengths of the one or more of the incoming plurality of participant voice streams.

16. The system of claim 11, wherein the mixer is further operable to transmit the incoming moderator voice stream, and transmit each of the plurality of incoming participant voice streams with a diminished signal strength, while the incoming moderator voice stream is being transmitted.

17. The system of claim 11, wherein the mixer is further operable to detect an increase in signal strength of the incoming moderator voice stream, and transmit the participant voice streams with a diminished signal strength approximately proportional to the increase in signal strength of the incoming moderator voice stream.

18. The system of claim 11, wherein the mixer is further operable to transmit the plurality of participant voice streams and the moderator voice stream such that a listener perceives the moderator voice stream as coming from a different spatial location than the plurality of participant voice streams.

19. The system of claim 18, wherein the mixer is further operable to transmit the moderator voice stream such that a listener perceives the moderator as positioned closer to the listener than the conference participants.

20. The system of claim 18, wherein the mixer is further operable to transmit the moderator voice stream using Head Related Transfer Function (HRTF) positional filtering.

21. Logic encoded in media for improving the intelligibility of a moderator during a multi-party communication session, the logic being operable to perform the following steps:

automatically identify a moderator initiating the multi-party communication session;

receive a plurality of incoming participant voice streams from a plurality of respective conference participants;

receive an incoming moderator voice stream from the moderator; and automatically process the incoming plurality of participant voice stream and the incoming moderator voice streams based on the identification of the moderator and without input from any participant or the moderator during the multi-party communication session such that the intelligibility of the incoming moderator voice stream is always improved relative to at least one of the incoming participant voice streams.

22. The logic encoded in media of claim 21, wherein the logic is further operable to perform the following steps:
for each of the incoming participant voice streams, storing a respective priority before the initiation of the communication session, such that at least one lowest priority participant voice stream may be identified;
detect the incoming moderator voice stream;
transmit the incoming moderator voice stream to the conference participants; and
automatically prevent the at least one lowest priority voice stream from being received by the conference participants while the moderator voice stream is being transmitted.

23. The logic encoded in media of claim 21, wherein the logic is further operable to transmit the incoming moderator voice stream with an enhanced signal strength relative to a signal strength of the incoming moderator voice stream.

24. The logic encoded in media of claim 23, wherein the enhanced signal strength comprises approximately three decibels in a 2–3 kHz range.

25. The logic encoded in media of claim 21, wherein the logic is further operable to transmit one or more of the plurality of incoming participant voice streams with a diminished signal strength relative to signal strengths of the one or more of the plurality of incoming participant voice streams.

26. The logic encoded in media of claim 21, wherein the logic is further operable to:
transmit the incoming moderator voice stream; and
transmit each of the plurality of incoming participant voice streams with a diminished signal strength, while the incoming moderator voice stream is being transmitted.

27. The logic encoded in media of claim 21, wherein the logic is further operable to perform the following steps:
detect an increase in signal strength of the incoming moderator voice stream; and
transmit the participant voice streams with a diminished signal strength approximately proportional to the increase in signal strength of the incoming moderator voice stream.

28. The logic encoded in media of claim 21, wherein the logic is further operable to transmit the plurality of participant voice streams and the moderator voice stream such that a listener perceives the moderator voice stream as coming from a different spatial location than the plurality of participant voice streams.

29. The logic encoded in media of claim 28, wherein the logic is further operable to transmit the moderator voice stream such that a listener perceives the moderator as positioned closer to the listener than the conference participants.

30. The logic encoded in media of claim 28, wherein the logic is further operable to transmit the moderator voice stream using Head Related Transfer Function (HRTF) positional filtering.

31. A system, comprising:
means for automatically identifying a moderator initiating the multi-party communication session;
means for receiving a plurality of incoming participant voice streams from a plurality of respective conference participants;
means for receiving an incoming moderator voice stream from the moderator; and
means for automatically processing the incoming plurality of participant voice streams and the incoming moderator voice stream based on the identification of the moderator and without input from any participant or the moderator during the multi-party communication session such that the intelligibility of the incoming moderator voice stream is always improved relative to at least one of the incoming participant voice streams.

32. The system of claim 31, further comprising:
means for storing a respective priority before the initiation of the communication session for each of the incoming participant voice streams, such that at least one lowest priority participant voice stream may be identified;
means for transmitting the incoming moderator voice stream to the conference participants; and
means for automatically preventing the at least one lowest priority voice stream from being received by the conference participants while the moderator voice stream is being transmitted.

33. The system of claim 31, further comprising means for transmitting the incoming moderator voice stream with an enhanced signal strength relative to a signal strength of the incoming moderator voice stream.

34. The system of claim 33, wherein the enhanced signal strength comprises approximately three decibels in a 2–3 kHz range.

35. The system of claim 31, further comprising means for transmitting one or more of the plurality of incoming participant voice streams with a diminished signal strength relative to signal strengths of the one or more of the plurality of incoming participant voice streams.

36. The system of claim 31, further comprising:
means for transmitting the incoming moderator voice stream; and
means for transmitting each of the plurality of incoming participant voice streams with a diminished signal strength, while the incoming moderator voice stream is being transmitted.

37. The system of claim 31, further comprising:
means for detecting an increase in signal strength of the incoming moderator voice stream; and
means for transmitting the participant voice streams with a diminished signal strength approximately proportional to the increase in signal strength of the incoming moderator voice stream.

38. The system of claim 31, further comprising means for transmitting the plurality of participant voice streams and the moderator voice stream such that a listener perceives the moderator voice stream as coming from a different spatial location than the plurality of participant voice streams.

39. The system of claim 38, further comprising means for transmitting the moderator voice stream such that a listener perceives the moderator as positioned closer to the listener than the conference participants.

40. The system of claim 38, further comprising means for transmitting the moderator voice stream using Head Related Transfer Function (HRTF) positional filtering.

* * * * *